United States Patent [19]

Yamakawa

[11] Patent Number: 5,221,582
[45] Date of Patent: Jun. 22, 1993

[54] MAGNETIC RECORDING MEDIUM CONTAINING A BINDER CONSISTING ESSENTIALLY OF A SPECIFIED VINYL CHLORIDE POLYMER AND A SPECIFIED POLYURETHANE POLYMER

[75] Inventor: Masahiro Yamakawa, Kawasaki, Japan

[73] Assignee: Nippon Zeon Co., Ltd., Tokyo, Japan

[21] Appl. No.: 603,547

[22] Filed: Oct. 26, 1990

[30] Foreign Application Priority Data

Oct. 26, 1989 [JP] Japan ................................ 1-279563

[51] Int. Cl.⁵ ............................................... G11B 5/00
[52] U.S. Cl. .................................. 428/425.9; 428/522; 428/694; 428/900
[58] Field of Search ...................... 428/694, 900, 425.9, 428/424.6, 522

[56] References Cited

U.S. PATENT DOCUMENTS

| 3,490,945 | 1/1970 | Slovinsky | 117/235 |
| 4,970,127 | 11/1990 | Smith et al. | 428/694 |
| 4,985,314 | 1/1991 | Merriam et al. | 428/694 |
| 5,030,521 | 7/1991 | Nishikawa et al. | 428/694 |

Primary Examiner—Paul J. Thibodeau
Assistant Examiner—Stevan A. Resan
Attorney, Agent, or Firm—Sherman and Shalloway

[57] ABSTRACT

A magnetic recording medium comprising a non-magnetic substrate and a magnetic powder-containing magnetic layer formed thereon, said layer further containing, as a binder for the magnetic powder, a vinyl chloride polymer containing 2% by weight or less of hydroxyl group(s) not directly bonding to the main chain and a polyurethane containing 2.3 or more isocyanate groups per molecule and having a molecular weight of 2,000 or more and the two polymers being crosslinked by each other.

3 Claims, No Drawings

MAGNETIC RECORDING MEDIUM CONTAINING A BINDER CONSISTING ESSENTIALLY OF A SPECIFIED VINYL CHLORIDE POLYMER AND A SPECIFIED POLYURETHANE POLYMER

The present invention relates to a magnetic recording medium such as magnetic tape or the like, comprising a non-magnetic substrate and a magnetic powder-containing magnetic layer formed thereon.

In recent years, recording in higher density has been required for magnetic recording media. For magnetic tapes, for example, there are required highly saturated magnetic flux density (Bm), high squareness ratio (Rs) [Rs=residual magnetic flux density (Br)/saturated magnetic flux density (Bm), low surface roughness, excellent flexibility and excellent abrasion resistance. In order to meet the requirement of high S/N ratio, a fine magnetic powder having a specific surface area of 30–70 m$^2$/g is uniformly dispersed and bound strongly; therefore, the binder for the magnetic powder must have excellent dispersibility and a strong binding power.

As the method for endowing a binder with dispersibility, it is known to introduce a hydrophilic group (e.g. hydroxyl group, carboxyl group, sulfonic acid group, sulfuric acid group, phosphoric acid group, amino group, quaternary ammonium salt group) into the binder. As the binder, there have been widely used a vinyl chloride polymer or a polyurethane because the former can allow the magnetic layer obtained to have a smooth surface and a strength and the latter can allow the magnetic layer to have good abrasion resistance. Therefore, a vinyl chloride polymer or a polyurethane, both containing the above-mentioned hydrophilic group has come to be used in recent years.

Meanwhile, in order to endow a binder with a strong binding power, it is effective to allow the binder to have a larger molecular weight. Increase in molecular weight of binder results in increase in viscosity of a magnetic coating in which a magnetic powder and a binder are dispersed, making poor the dispersibility of the magnetic powder in the coating. In this case, the finer the magnetic powder, the higher tends to be the viscosity of the magnetic coating. Hence, there is needed other method for endowing a binder with a strong binding powder, which is not dependent upon the increase in molecular weight. As one such method, the crosslinking of binder by polyisocyanate compound is in wide use. In order to enable this crosslinking by polyisocyanate compound, it has been suggested to introduce into a binder a group (e.g. hydroxyl group) having active hydrogen capable of reacting with the isocyanate group of the polyisocyanate compound.

However, when a large amount of hydroxyl group is introduced into a binder, there occurs reduction in dispersibility and stability of a magnetic powder in a magnetic coating comprising the magnetic powder, the hydroxyl group-introduced binder, a lubricant (e.g. fatty acid or its ester), etc.; as a result, it is impossible to stably produce a magnetic recording medium having good properties. For example, when there is used, as a binder, VAGH (a vinyl chloride-vinyl acetate-vinyl alcohol copolymer manufactured by Union Carbide, U.S.A., containing 2.3% by weight of hydroxyl group) which has been used as a binder of vinyl chloride polymer type, there occurs agglomeration right after the preparation of a magnetic coating. Also when there is used a binder obtained by substituting part of the hydroxyl group of VAGH with a compound containing sodium sulfonate [disclosed in, for example, Japanese Patent Application Kokai (Laid-Open) No. 44227/1980], if the binder contains a large amount of residual hydroxyl group, the dispersibility and stability of a magnetic powder in the resulting magnetic coating is poor. Meanwhile, when the amount of hydroxyl group introduced into a binder is small, the crosslinking of the resulting binder by a polyisocyanate compound is insufficient and the crosslinked binder has no strong binding force as intended; the isocyanate group of the polyisocyanate compound is excessive relative to the hydroxyl group of the binder before crosslinking and the excessive portion of the polyisocyanate compound reacts with moisture in air, making brittle the magnetic layer formed.

In order to enhance the reactivity between hydroxyl group and isocyanate group and obtain a high crosslinking degree with a small amount of hydroxyl group, it is considered to additionally use a reaction accelerator such as tertiary amine, organotin compound and the like. In this case, however, it is difficult to control the pot life of magnetic coating. The use of primary hydroxyl group is effective to improve the reactivity with isocyanate group (i.e. crosslinking degree) using a smaller amount of hydroxyl group; however, when the amount of polyisocyanate compound is reduced to such an extent that the residual portion of the polyisocyanate compound gives no adverse effect, the crosslinking of binder by polyisocyanate compound is insufficient because the reaction between binder and polyisocyanate compound is conducted in a solid phase of magnetic layer.

In order to obtain a magnetic layer which is not brittle even if the residual portion of a polyisocyanate compound has reacted with moisture in air, there can be used, as the polyisocyanate compound, an urethane prepolymer having isocyanate groups at the both terminals, or a moisture-curable polyurethane. These compounds, however, have adhesivity due to incomplete reaction and it is difficult to control the pot life of the resulting magnetic coating.

The present inventor investigated on the above conventional problems associated with the higher-density recording and higher durability required for magnetic recording media. As a result, the present inventor found that the combined use of a particular vinyl chloride polymer and a particular polyurethane resin as a binder for magnetic powder can produce a magnetic coating of low viscosity in which a fine magnetic powder is dispersed stably and that the magnetic recording medium obtained by coating said magnetic coating on a non-magnetic substrate can exhibit excellent magnetic properties, durability and travelling property stably under wide environmental conditions. The above finding has led to the completion of the present invention.

According to the present invention, there are provided a magnetic recording medium comprising a non-magnetic substrate and a magnetic powder-containing magnetic layer formed thereon, said layer further containing, as a binder for the magnetic powder, a vinyl chloride polymer containing 2% by weight or less of hydroxyl group(s) not directly bonding to the main chain and a polyurethane containing 2.3 or more isocyanate groups per molecule and having a molecular weight of 2,000 or more and the two polymers being crosslinked by each other, and a magnetic recording medium wherein the above vinyl chloride polymer contains, besides the hydroxyl group(s), at least one kind of group selected from the group consisting of (a) anionic hydrophilic groups derived from carboxylic acids, or sulfur or phosphorus-containing acids or salts thereof and (b) cationic hydrophilic groups selected from the formula $-NR^1R^2R^3X$ or $-NR^2 \cdot HX^1$ wherein $R^1$, $R^2$, $R^3$ and R each represent an alkyl group, an allyl group, an alkenyl group or an alkoxy group, and X and $X^1$ each represent a halogen atom, a residue of sulfuric acid, phosphoric acid or nitric acid, or a residue of an organic acid such as carboxylic acid, acidic sulfuric acid ester, acidic phosphoric acid ester or the like.

The vinyl chloride polymer containing 2% by weight or less of hydroxyl group(s) not directly bonding to the main chain, used in the present invention can be obtained by copolymerizing a radical-polymerizable unsaturated compound (hereinafter referred to as monomer) containing hydroxyl group(s) not directly bonding to the carbons taking part in polymerizable double bond(s), with vinyl chloride and, if necessary, other monomer copolymerizable therewith, in the presence of a radical-generating agent.

As examples of the monomer which gives hydroxyl group(s) to the vinyl chloride polymer of the present invention, there can be mentioned $C_{2-8}$ alkanol esters of alpha, beta-unsaturated acid, such as 2-hydroxyethyl (meth)acrylate, 2-hydroxypropyl (meth)acrylate and the like; esters between polyalkylene glycol and (meth)acrylic acid, represented by the following formula

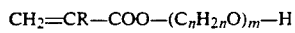

$$CH_2=CR-COO-(C_nH_{2n}O)_m-H$$

(m is an integer of 2–0, n is an integer of 2–4, and R is a hydrogen atom or a methyl group); mono(meth)acrylic acid esters of dicarboxylic acid dihydroxyester, such as 2-hydroxyethyl 2'-(meth)acryloyloxyphthalate, 2-hydroxyethyl 2'-(meth)acryloyloxysuccinate and the like; (meth)acrylamide such as N-methylol(meth)acrylamide and the like; alkylene glycol esters of unsaturated dicarboxylic acid, such as di-2-hydroxyethyl maleate, di-4-hydroxybutyl maleate, di-2-hydroxypropyl itaconate and the like; olefinic alcohols such as 3-buten-1-ol, 5-hexen-1-ol and the like; vinyl ethers such as 2-hydroxyethyl vinyl ether, 2-hydroxypropyl vinyl ether and the like; mono(meth)allyl ethers of alkylene glycol, such as (meth)allyl 2-hydroxyethyl ether, (meth)allyl 2-hydroxypropyl ether, (meth)allyl 3-hydroxypropyl ether, (meth)allyl 2-hydroxybutyl ether, (meth)allyl 3-hydroxybutyl ether, (meth)allyl 4-hydroxybutyl ether, (meth)allyl 6-hydroxyhexyl ether and the like; polyoxyalkylene glycol mono(meth)allyl ethers such as diethylene glycol mono(meth)allyl ether, dipropylene glycol mono(meth)allyl ether and the like; mono(meth)allyl ethers of halogen-substituted or hydroxy-substituted (poly)alkylene glycol, such as glycerine mono(meth)allyl ether, (meth)allyl 2-chloro-3-hydroxypropyl ether, (meth)allyl 2-hydroxy-3-chloropropyl ether and the like; mono(meth)allyl ethers of polyhydric phenol, such as eugenol, isoeugenol and the like; mono(meth)allyl ethers and mono(meth)thioallyl ethers of polyhydroxy compound, such as (meth)allyl 2-hydroxyethyl thioether, (meth)allyl 2-hydroxypropyl thioether and the like; vinyl alcohol; and (meth)allyl alcohol. Of these, preferable are mono(meth)allyl ethers and mono(meth)thioallyl ethers of polyhydroxy compound in view of their thermal stability and reactivity.

The amount of hydroxyl group(s) introduced by the monomer is required to be 2.0% by weight or less. When the amount is more than 2.0% by weight, the pot life of resulting magnetic coating is too short, making it impossible to obtain a good magnetic coating, and the dispersibility and stability of magnetic powder is reduced.

Examples of the monomer used for introducing a carboxylic acid, or a sulfur- or phosphorus-containing acid or a salt thereof into the vinyl chloride copolymer used in the present invention, are as follows.

As examples of the monomer for introducing a carboxylic acid, there can be mentioned, unsaturated mono- or dicarboxylic acids such as acrylic acid, methacrylic acid, and the like; and alkyl monoesters of unsaturated dicarboxylic acid, such as monomethyl maleate, mono-2-hydroxyethyl maleate, monobutyl itaconate, mono-2-hydroxypropyl itaconate and the like.

As examples of the monomer for introducing a sulfur-containing acid or a salt thereof, there can be mentioned acids such as vinylsulfonic acid, methylvinylsulfonic acid, (meth)allylsulfonic acid, 2-sulfonic acid-ethyl (meth)acrylate, 2-acrylamide-2-methylpropanesulfonic acid, 3-allyloxy-2-hydroxypropanesulfonic acid and the like, as well as alkali metal salts or ammonium salts of said acids; and acids such as 2-sulfuric acidethyl (meth)acrylate, 3-allyloxy-2-hydorxypropanesulfonic acid and the like, as well as alkali metal salts or ammonium salts of said acids. Of these, sulfonic acids and their salts are easiest to obtain and many in kind.

As examples of the monomer for introducing a phosphorus-containing acid or a salt thereof, there can be mentioned acids such as 3-chloro-2-phosphoric acid-propyl (meth)acrylate, 3-allyloxy-2-hydroxypropanephosphoric acid and the like, as well as alkali metal salts or ammonium salts of said acids; and acids such as vinylphosphoric acid, acrylamidemethanephosphonic, 2-phosphonic acid-ethyl (meth)acrylate, 3-allyoxy-2-hydroxypropanephosphinic acid and the like, as well as alkali metal salts or ammonium salts of said acids.

When a vinyl chloride polymer used in the present invention is produced, particularly when an epoxy-containing monomer is copolymerized with a hydroxyl group-containing monomer and vinyl chloride, it is possible, before, during or after the copolymerization reaction, to add to the epoxy group site a carboxylic acid or an alkali metal salt or ammonium salt of a sulfur- or phosphorus-containing acid in an aqueous or non-aqueous system. As examples of the alkali metal salt or ammonium salt of a sulfur- or phosphorus-containing acid, there can be mentioned potassium sulfite, sodium thiosulfate, ammonium hydrogensulfate, disodium hydrogenphosphate, ammonium hydrogenphosphite, potassium sulfanilate, potassium persulfate, sodium perphosphate and the like. The addition of salt of sulfur- or phosphorus-containing strong acid in the copolymerization of an epoxy-containing monomer with vinyl chloride is described in more detail in Japanese Patent Application Kokai (Laid-Open) Nos. 238306/1985, 238371/1985 and 53367/1986.

The amount of the anionic hydrophilic group is preferably such that the molecular weight (equivalents) of vinyl chloride polymer per one hydrophilic group is in the range of 4,000–40,000. When the equivalents are less than 4,000, the resulting magnetic recording medium has low moisture resistance. When the equivalents are more than 40,000, the meritorious effect intended by the present invention is not expressed.

In introducing a quaternary ammonium salt group represented by the formula $-N^{\oplus}R^1R^2R^3X^{\ominus}$, into the vinyl chloride polymer used in the present invention, copolymerization of a vinyl chloride with a monomer containing a quaternary ammonium salt group is the first approach. As such a monomer, there can be used diallyldimethylammonium chloride, diallyldimethylammonium stearate, 2-hydroxy-3-allyloxypropyltrimethylammonium chloride, 2-hydroxy-3-allyloxypropyldimethylstearylammonium acetate, vinylbenzyltrimethylammonium chlorie, (meth)acryloyloxyethyltrimethylammonium chloride, 2-hydroxy-3-methacryloyloxypropyltrimethylammonium chloride, (meth)acryloyloxypropyldimethylbenzyl chloride, (meth)acrylamidopropyltrimethylammonium chloride, etc.

As the second approach for introducing a quaternary ammonium salt group into the vinyl chloride polymer, there is reaction of an epoxy group-containing vinyl chloride copolymer with a tertiary amine in the presence or absence of an acid. This approach is described in detail in the second method of Japanese Patent Application Kokai (Laid-Open) No. 121117/1988 filed by the present inventors.

In introducing a tertiary amine group represented by the formula $-NH_2 \cdot HX^1$ into the vinyl chloride polymer used in the present invention, there is generally used copolymerization of vinyl chloride with a monomer containing said tertiary amine group. As such a monomer, there can be used N,N-diethyl-N'-(meth)acryloylethylenediamine acetate, N,N-diethyl-N'-(meth)acryloyl-1,3-propylenediamine benzenesulfonate, N,N-diethyl-N'-(meth)acryloyl-1,3-propylenediamine diethylphosphonate, etc.

As the anion of the quaternary ammonium salt or the tertiary amine salt, there are used a halogen atom; a residue of sulfuric acid, phosphoric acid or nitric acid; or a residue of an organic acid such as acidic sulfuric acid ester, acidic phosphoric acid ester or the like.

The amount of the $-N^{\oplus}R^1R^2R^3X^{\ominus}$ group and the $-NR_2 \cdot HX_1$ group in the vinyl chloride polymer obtained as above, is preferably 0.02-0.5% by weight in terms of nitrogen content. When the amount is less than 0.02% by weight, no meritorious effect of the present invention is obtained. When the amount is more than 0.5% by weight, the resulting magnetic recording medium has no sufficient moisture resistance.

The vinyl chloride polymer used in the present invention can further comprise, as necessary, other monomer copolymerizable with the monomers mentioned above. As examples of the other monomer, there can be mentioned vinyl carboxylates such as vinyl acetate, vinyl propionate and the like; vinyl ethers such as methyl vinyl ether, isobutyl vinyl ether, cetyl vinyl ether and the like; vinylidene compounds such as vinylidene chloride, vinylidene fluoride and the like; unsaturated carboxylic acid anhydrides such as maleic anhydride, itaconic anhydride and the like; alkyl unsaturated carboxylates such as diethyl maleate, dibutyl maleate, diethyl itaconate, methyl (meth)acrylate, ethyl (meth)acrylate and the like; unsaturated nitriles such as acrylonitrile and the like; aromatic vinyl compounds such as styrene, alpha-methylstyrene, p-methylstyrene, p-methylstyrene and the like; allyl glycidyl ether; glycidyl methacrylate; and epoxy-containing monomers such as vinylcyclohexane monooxide and the like.

These comonomers are used in order to control the compatibility of the vinyl chloride copolymer and other resins as well as the softening point of the copolymer and also to improve the solubility of the copolymer.

The vinyl chloride polymer used in the present invention has a polymerization degree of 200-900, preferably 230-500. When the polymerization degree is less than 200, the resulting magnetic layer has insufficient abrasion resistance. When the polymerization degree is more than 900, the resulting magnetic coating has too high a viscosity, which tends to invite insufficient dispersion of magnetic powder.

The vinyl chloride polymer for magnetic coating, used in the present invention can be produced by any known polymerization method. In view of the solubility of the polymer in solvent, there is preferred solution polymerization, or suspension polymerization using, as a polymerization medium, a lower alcohol (e.g. methanol or ethanol) alone or in combination with deionized water. Emulsion polymerization is convenient when a water-soluble salt containing a sulfur- or phosphorus-containing strong acid radical is used in the reaction. As the polymerization initiator used in the production of the vinyl chloride polymer, there can be mentioned, for example, organic peroxides such as lauroyl peroxide, diisopropyl peroxydicarbonate, di-2-ethylhexyl peroxydicarbonate, t-butyl peroxypivalate, 3,5,5-trimethylhexanoyl peroxide and the like; azo compounds such as alpha,alpha'-azobisisobutyronitrile and the like; and persulfates such as ammonium persulfate, potassium persulfate and the like. As the suspending agent, there can be mentioned, for example, polyvinyl alcohol; partial saponification product of polyvinyl acetate; cellose derivatives such as methyl cellulose and the like; synthetic polymeric substances such as polyvinyl pyrrolidone, maleic anhydride-vinyl acetate copolymer, polyacrylamide and the like; and natural polymeric substances such as starch, gelatin and the like. As the emulsifier, there can be mentioned, for example, anionic emulsifiers such as sodium alkylbenzenesulfonate, sodium lauryl sulfate and the like; and non-ionic emulsifiers such as polyoxyethylene alkyl ether, polyoxyethylene sorbitan partially esterified with fatty acid, and the like. As necessary, there can also be used a molecular weight modifier such as trichloroethane, thioglycol or the like. The above-mentioned polymerization initiator, vinyl chloride and other monomers, suspending agent, emulsifier, molecular weight modifier, etc. can be added to the polymerization system in one portion at the start of polymerization, or in portions during the polymerization. The polymerization is effected usually at 35°-80° C. with stirring.

The polyurethane resin used in the present invention is required to have a molecular weight of 2,000 or more. When the molecular weight is smaller than 2,000, the polyurethane resin has low strength and cannot act as a good binder, and moreover tends to cause sticking to calender roll in the step for surface formation treatment.

The polyurethane resin used in the present invention is required to have 2.3 or more isocyanate groups per molecule. When the isocyanate groups are less than 2.3, the vinyl chloride polymer and the polyurethane resin do not bond to each other in a sufficient network structure and accordingly the resulting magnetic recording medium has no satisfactory mechanical properties and abrasion resistance.

The polyurethane resin having a molecular weight of 2,000 or more and 2.3 or more isocyanate groups per molecule, used in the present invention can be obtained from a mixture of an organic diisocyanate and a polyol having 3 or more hydroxyl groups per molecule, or from a mixture of an organic diisocyante, said polyol and a linear diol having terminal hydroxyl group(s). Said polyurethane resin can also be obtained from a mixture of an organic polyisocyanate having 3 or more isocyanate groups per molecule and a diol.

As examples of the organic diisocyanate, there can be mentioned 2,4-tolylene diisocyanate (hereinafter referred to as 2,4-TDI), 2,6-tolylene diisocyanate (hereinafter referred to as 2,6-TDI), their mixture, 4,4'-diphenylmethane diisocyanate (hereinafter referred to as MDI), p-phenylene diisocyanate, m-phenylene diisocyanate, 1,5-naphthylene diisocyanate, isophorone diisocyanate, hexamethylene diisocyanate, lysine diisocyanate, xylylene diisocyanate, hydrogenated MDI, cyclohexane diisocyanate and their mixtures. Of these, preferable are 2,4-TDI, 2,6-TDI, MDI and their mixtures.

As the linear diol having terminal hydroxyl group(s), there can be mentioned, for example, polyether polyols having terminal hydroxyl group(s), having a molecular weight of 500–6,000, polyester polyols and low-molecular glycols. As the polyether polyols, there can be mentioned, for example, polyethylene glycol, polypropylene glycol and polytetramethylene glycol. As the polyester polyols, there can be mentioned those compounds obtained by polycondensing at least one glycol (e.g. ethylene glycol, 1,2-propylene glycol, 2,3-butylene glycol, 1,4-butylene glycol, 2,2-dimethyl-1,3-propanediol, diethylene glycol, 1,5-pentamethylene glycol, 1,6-hexamethylene glycol, 3-methyl-1,5-pentanediol, cyclohexane-1,4-diol, cyclohexane-1,4-dimethanol) with a dibasic acid (e.g. succinic acid, maleic acid, adipic acid, glutaric acid, pimelic acid, suberic acid, azelaic acid, sebacic acid, phthalic acid, isophthalic acid, terephthalic acid, hexahydroterephthalic acid, hexahydroisophthalic acid), its ester or its halide. There can also be mentioned polycaprolactonediols obtained by subjecting epsilon-caprolactone or the like to ring-opening addition polymerization in the presence of the above-mentioned glycol. As the low-molecular glycols, there can be used the glycols used in the production of the above polyester polyol, alone or in admixture. Further, there can be mentioned diols obtained by adding 2–4 moles of ethylene oxide, propylene oxide, butylene oxide or the like to 1 mole of bisphenol A or hydroquinone.

As the polyol having 3 or more hydroxyl groups per molecule, there can be mentioned, for example, low-molecular tri- or tetraols such as trimethylolethane, trimethylolpropane, glycerine, pentaerythritol and the like; triethanolamine; polyether polyols such as polypropylene ether polyol, polyethylene polyol, polybutylene polyol and the like, obtained by adding propylene oxide, ethylene oxide or butylene oxide to the above-mentioned polyether polyol having terminal hydroxyl group(s), having a molecular weight of 500–6,000; polyester polyols obtained by polycondensing a mixture of the above-mentioned low-molecular triol and the above-mentioned low-molecular glycol with the above-mentioned dibasic acid, its ester or its halide; and polycaprolactone polyols obtained by subjecting a lactone (e.g. epsilon-caprolactone) to ring-opening addition polymerization in the presence of said triol-glycol mixture.

In producing the polyurethane resin used in the present invention, the NCO/OH molar ratio of organic diisocyanate and polyol is 1–1.6. When the molar ratio deviates from the range, the resulting magnetic recording medium has no excellent properties as intended by the present invention.

In producing the polyurethane resin in the present invention, there may be added, as necessary, an organometal compound as a catalyst, for example, dibutyltin laurate or a tertiary amine (e.g. N-methylmorpholine, triethylamine). In order to increase the stability of the resin, etc., there may also be added an antioxidant, an ultraviolet absorber, a hydrolysis inhibitor, etc.

The polyurethane resin used in the present invention can be produced by a conventionally known method. There can be used, for example, a method comprising mixing reactants thoroughly, in the presence of, if necessary, a catalyst, casting the mixture on a flat plate or a flat surface and heating it, cooling the reaction mixture, and crushing it; a method comprising injecting a mixture of reactants into an extruder; and a solution reaction method comprising reacting reactants in at least one organic solvent selected from dimethylformamide, toluene, xylene, benzene, dioxane, cyclohexane, methyl ethyl ketone, methyl isobutyl ketone, ethyl acetate, butyl acetate, etc.

The binder for magnetic powder, in the magnetic recording medium of the present invention is preferably a mixture of about 20 to about 80% by weight, based on the total amount of the binder, of the vinyl chloride polymer and about 80 to about 20% by weight of the polyurethane resin. The binder is mixed with known materials such as magnetic powder, lubricant, abrasive, antistatic agent and, as necessary, dispersing agent, crosslinking agent, etc. in a solvent composed mainly of a ketone; the resulting mixture is subjected to a dispersing treatment to prepare a magnetic coating; the coating is coated on a non-magnetic film (e.g. polyester film); the coated film is subjected to an orientation treatment and a surface formation treatment and further, depending upon the application of the resulting magnetic recording medium, to a heat treatment (for crosslinking) and surface polishing; the resulting film is subjected to steps such as cutting, assembly and the like; thus, the magnetic recording medium of the present invention can be obtained.

The magnetic powder used in the present invention is preferably a fine powder. There can be used metal magnetic powders of Fe, Co, etc.; ferroalloy magnetic powders composed of Fe and Co (main components), Ni, etc.; iron oxide magnetic powders of gamma-$Fe_2O_3$, $Fe_3O_4$ and gamma-$FeO_x$ ($1.33 < X < 1.5$), as well as magnetic powders obtained by impregnating said iron oxides with Co or by allowing Co to adhere to said iron oxides; barium ferrite; iron carbide magnetic powders of $Fe_5C_2$, etc.; iron nitride magnetic powder; chromium oxide magnetic powder; and so forth. As the lubricant, there can be used $C_{8-18}$ fatty acids, higher alcohols, amides, fatty acid esters, etc. There can be specifically mentioned lauric acid, myristic acid, palmitic acid, stearic acid, oleic acid, linoleic acid, stearolic acid, stearyl alcohol, palmityl alcohol, laurylamide, dimethylstearylamide, butyllaurylamide, butyl stearate, octyl stearate, etc. As the lubricant, there can also be used a silicone oil, a fluorine-based oil (e.g. polyperfluoroalkylene oxide, perfluoroalkane), paraffin wax, an oxidized polyethylene, etc. Further, there can also be used solid lubricants such as carbon black, graphite, molybdenum disulfide, tungsten disulfide and the like. The lubricants are used in an amount of 1–6 parts per 100 parts of magnetic powder.

As the abrasive, there are generally used alumina, silicon carbide, chromium oxide, corundum, etc.

The antistatic agent includes conductive powders such as graphite, carbon black and the like, as well as surfactant antistatic agents such as nonionic surfactants (e.g. polyalkylene oxide), cationic surfactants (e.g. quaternary ammonium salt) and the like.

In the magnetic recording medium of the present invention, there may be used, in addition to the vinyl chloride polymer and the polyurethane resin, other generally employed binders. Examples of such binders are a cellulose-based resin, a phenoxy resin, an epoxy resin, a butyral resin, an acrylic resin and an acrylonitrilebutadiene rubber. The proportion of these resins used together with the vinyl chloride polymer and the polyurethane resin must not exceed 50% of the total amount of all binders.

Thus, according to the present invention, there can be obtained a magnetic coating of low viscosity in which a fine magnetic powder is dispersed stably; and the magnetic recording medium obtained with the coating has a coating film of good surface smoothness and durability, and is excellent in travelling property and magnetic properties.

The present invention is described more specifically below referring to Examples. In the Examples and Comparative Examples, parts and % are by weight unless otherwise specified.

Synthesis Example 1 of Vinyl Chloride Polymer

Into a degassed polymerization vessel were fed 60 parts of vinyl chloride, 5 parts of allyl 2-hydroxyethyl ether, 10 parts of vinyl acetate, 0.5 part of allyl glycidyl ether, 150 parts of deionized water, 1 part of azobisisobutyronitrile, 1 part of polyoxyethylene stearyl ether and 0.1 part of methyl cellulose. Polymerization was initiated at 60° C. 40 parts of vinyl chloride were continuously injected into the polymerization vessel for the period of the third hour to the seventh hour from the start of polymerization. When the pressure inside the polymerization vessel became 3 kg/cm$^2$, unreacted vinyl chloride was recovered. The residue (polymerization mixture) was dehydrated, washed with deionized water, and dried to obtain a vinyl chloride polymer (A).

Synthesis Example 2 of Vinyl Chloride Polymer

Into a polymerization vessel were fed 200 parts of deionized water, 1 part of sodium lauryl sulfate, 1 part of potassium hydrogencarbonate and 4 parts of potassium persulfate. After degassing, there were fed 7 parts of allyl glycidyl ether, 8 parts of allyl 2-hydroxyethyl ether and 60 parts of vinyl chloride. The mixture was heated to 53° C. and polymerization was initiated. During the polymerization, each time (four times in total) the pressure inside the polymerization vessel decreased to 5 kg/cm$^2$, 10 parts (40 parts in total) of vinyl chloride were injected into the vessel. When the pressure inside the vessel became 3.5 kg/cm$^2$, unreacted vinyl chloride was recovered and the residue (polymerization mixture) was coagulated. The resulting polymer was thoroughly washed with hot water, dehydrated, and dried to obtain a vinyl chloride polymer (B).

Synthesis Example 3 of Vinyl Chloride Polymer

Into a degassed polymerization vessel were fed 60 parts of vinyl chloride, 5 parts of allyl 2-hydroxypropyl ether, 2 parts of monomethyl maleate, 8 parts of vinyl acetate, 0.5 part of allyl glycidyl ether, 150 parts of deionized water, 1 part of azobisisobutyronitrile, 1 part of polyoxyethylene stearyl ether and 0.1 part of methyl cellulose. Polymerization was initiated at 60° C. 40 parts of vinyl chloride was continuously injected into the polymerization vessel for the period of the third hour to the seventh hour from the start of polymerization. When the pressure inside the polymerization vessel became 3 kg/cm$^2$, unreacted vinyl chloride was recovered. The residue (polymerization mixture) was dehydrated, washed with deionized water, and dried to obtain a vinyl chloride polymer (C).

Synthesis Example 4 of Vinyl Chloride Polymer

Into a degassed polymerization vessel were fed 70 parts of vinyl chloride, 220 parts of methanol and 1 part of alpha-cumyl peroxyneodecanate. The mixture was heated to 43° C, and polymerization was initiated. For the period of right after the start of polymerization to the 6th hour, there was continuously injected into the polymerization vessel a mixture consisting of 30 parts of vinyl chloride, 0.4 parts of methacryloyloxyethyltrimethylammonium chloride, 0.4 part of 2-phosphoric acicethyl methacrylate (acid phosphoxyethyl methacrylate), 7 parts of 2-hydroxypropyl methacrylate and 1.4 parts of methanol. The resulting mixture was cooled after 10 minutes from the completion of the injection, and unreacted vinyl chloride was recovered. The residual slurry was subjected to liquid removal, washing and drying to obtain a vinyl chloride polymer (D).

The compositions of the vinyl chloride polymers (A) to (D) obtained in Synthesis Examples 1–4 are shown in Table 1 together with those of a vinly chloride-vinyl acetate-maleic acid terpolymer (E) (a commercial product) and a vinyl chloride-vinyl acetate-vinyl alcohol terpolymer (F) (a commercial product).

TABLE 1

| | Synthesized vinyl chloride polymer samples | | | | Commercial product | Commercial product |
|---|---|---|---|---|---|---|
| Synthesis example | 1 | 2 | 3 | 4 | | |
| Symbol of sample | A | B | C | D | E | F |
| Polymerization degree | 450 | 340 | 450 | 330 | 400 | 430 |
| Composition of polymer | | | | | | |
| Ionic hydrophilic group | — | —SO$_4$K | —COOH | —N(CH$_3$)$_3^{\oplus}$Cl$^{\ominus}$ | —COOH | — |
| Its equivalent | — | 17,000 | 12,000 | 35,000 | 12,000 | — |
| Amount of hyroxyl group (%) | 0.2 | 0.4 | 0.2 | 1.5 | — | 2.3 |
| Bonding of hydroxyl group to main chain | Via organic group | Same as left | Same as left | Same as left | Same as left | Directly |
| Vinyl chloride (%) | 88 | 88 | 88 | 86.5 | 86 | 91 |

E: Vinyl Light VMCH (a product of Union Carbide)
F: Vinyl Light VAGH (a product of Union Carbide)

Synthesis Example 1 of Polyurethanes 474.4 g of methyl ethyl ketone, 1,000 g (1.00 mole) of a polybutylene adipate having a molecular weight of 1,000 and 525.6 g (2.10 moles) of 4,4′-diphenylmethane diisocyanate were fed into a 5-liter temperature-controllable reactor provided with a propeller for stirring, a thermometer and a condenser. The mixture was reacted at 80° C. for 3 hours. There was then added 500 g (0.11 mole as trimethylolpropane) of a methyl ethyl ketone solution containing 3% of trimethylolpropane. The resulting mixture was reacted for 6 hours to obtain a polyurethane (b). The same procedure was repeated except that the amount of the methyl ethyl ketone solution of trimethylolpropane added was changed to 0 g, 1,000 g and 1,500 g, to obtain polyurethanes (a), (c) and (d), respectively.

The compositions of the polyurethanes (a) to (d) are shown in Table 2.

Synthesis Example 2 of Polyurethanes

Using a long-chain polyol, a diisocyanate compound and a short-chain polyol each shown in Table 3 and employing the same procedure as above, there were synthesized polyurethanes (e) to (h) shown in Table 3.

TABLE 2

| Sample | Synthesized polyurethane samples | | | |
|---|---|---|---|---|
| | a | b | c | d |
| NCO/OH ratio | 2.10 | 1.80 | 1.58 | 1.40 |
| Number-average molecular weight | 1390 | 1770 | 2380 | 3730 |
| NCO concentration (%) | 4.63 | 3.14 | 1.14 | 1.44 |
| Solid content (%) | 76.3 | 61.6 | 51.9 | 44.9 |
| Number of NCO groups per molecule | 2.0 | 2.13 | 2.34 | 2.72 |

TABLE 3

| Symbol of sample | Synthesized polyurethane samples | | | | | | |
|---|---|---|---|---|---|---|---|
| | e | | f | | g | h | |
| Long-chain polyol | PBA | | PCL | | PBA | PBA | |
| Molecular weight | 1000 | | 2000 | | 1000 | 1000 | |
| Number of OH groups | 2 | | 3 | | 2 | 2 | |
| Number of moles | 1 | | 0.5 | | 1 | 1 | |
| Diisocyanate | MDI | 2,4-TDI | MDI | 2,4-TDI | MDI | MDI | |
| Number of moles | 1.05 | 1.05 | 0.5 | 1.05 | 2.10 | 1.8 | |
| Short-chain polyol | TMP | | 1,4-BG | | 1,4-BG TEA | 1,4-BG | TMP |
| Molecular weight | 134 | | 90 | | 90  149 | 90 | 134 |
| Number of OH groups | 3 | | 2 | | 2   3 | 2 | 3 |
| Number of moles | 0.40 | | 0.22 | | 0.22  0.22 | 0.4 | 0.4 |
| NCO/OH ratio | 1.24 | | 1.60 | | 1.35 | 0.9 | |
| Number-average molecular weight | 4,330 | | 4,870 | | 3,170 | 50,000 | |
| NCO Concentration (%) | 1.17 | | 1.71 | | 1.42 | 0 | |
| Solid content (%) | 41.8 | | 46.7 | | 48.6 | 30.2 | |
| Number of NCO groups per molecule | 3.33 | | 3.52 | | 2.50 | 0 (terminal OH) | |

PBA: Polybutylene adipate
PCL: Polycaprolactone polyol
TMP: Trimethylolpropane
1,4-BG: 1,4-Hydroxybutane
TEA: Triethanolamine

Examples 1-6 and Comparative Examples 1-5

Resin solutions, magnetic coatings and magnetic tapes were prepared using the polymers prepared in the above Synthesis Examples, and evaluated according to the methods described below. The results are shown in Table 4 and Table 5.

The combination of a vinyl chloride polymer and a polyurethane resin used in the evaluation methods and the details of these two polymers are shown in Table 4 and Table 5. In Example 1 of Table 4 and Comparative Example 3 of Table 5, the respective resin solutions were further mixed with 15 parts of a polyisocyanate (Coronate L manufactured by Nippon Polyurethane Kogyo K. K.) and then evaluated. In Example 1 and Comparative Example 1 of Table 4, dispersion of a magnetic powder was effected by adding 3 parts of lecithin as a dispersing agent for the magnetic powder, whereby a magnetic coating was prepared and then evaluated.

(1) Pot Life 100 parts in total of a vinyl chloride copolymer and a polyurethane resin was stirred in 400 parts of methyl ethyl ketone at room temperature for 1 hour. The resulting solution was stored in a container at 23° C. and examined for the period (days) up to the time when the solution showed no flow when the container was made upside down. The days were recorded as pot life.

(2) Reactivity

The same solution as used in the pot life test was cast on a glass plate to obtain a sheet. The sheet was heated at 60° C for 24 hours. Then, 0.5 g of the sheet was weighed accurately and mixed with 50 g of tetrahydrofuran for 24 hours. The resulting insoluble matter was collected by filtration, washed, dried, and weighed accurately. A gel fraction was calculated from the following formula.

Gel fraction (%) =
[(weight of insoluble matter)/(weight of sample)] × 100

A larger gel fraction implies that the crosslinking reactivity between the two binders, i.e. The vinyl chloride polymer and the polyurethane is higher.

(3) Gloss

A mixture consisting of 400 parts of a powder of cobalt-adhering magnetic iron oxide having a specific surface area of 40 $m^2/g$, 50 parts of a vinyl chloride polymer, 49 parts of methyl ethyl ketone, 49 parts of toluene, 32 parts of cyclohexanone, 2 parts of carbon black, 4 parts of alumina, 2 parts of myristic acid and 1 part of butyl stearate, was subjected to a dispersion treatment under high speed shear for 90 minutes. To the resulting dispersion were added a polyurethane resin of an amount shown in Table 4 or Table 5, 30 parts of methyl ethyl ketone, 30 parts of toluene and 20 parts of cyclohexanone. The mixture was subjected to a dispersion treatment for 30 minutes. Thereafter, 50 parts in total of the same mixed solvent as above was added and, in Comparative Example 1 and Comparative Example 3, 15 parts of polyisocyanate (Coronate L manufactured by Nippon Polyurethane Kogyo K. K.) was also added; and the resulting mixture was subjected to a dispersion treatment for 10 minutes. The thus obtained magnetic coating was coated on a polyester film in a coating film thickness of 5 μm. The coated polyester film was subjected to an orientation treatment in a magnetic field and dried. The magnetic coating film obtained was measured for reflectivity at a 60° C. reflection angle using a gloss meter.

(4) Dispersibility

The same coating as used in evaluation of gloss was allowed to stand for 1 hour and then coated on a polyester film in a coating film thickness of 5 μm. The coated polyester film was subjected to an orientation treatment in a magnetic field and dried. The magnetic coating film obtained was measured for reflectivity at a 60° reflection angle using a gloss meter.

(5) Squareness Ratio (Br/Bm)

The same magnetic coating film as used in evaluation of gloss was cut into a size of 6 mm×6 mm. The cut piece was measured for squareness ratio using a magnetic properties tester.

(6) Durability

The same magnetic coating film as used in evaluation of gloss was subjected to a smoothening treatment by calender roll and then to a heating treatment at 65° for 65 hours. The resulting coating film was contacted with a rotating drum (150 rpm) to which an abrasive paper had been attached, under a load of 100 g; whereby the extent of adhesion of magnetic coating to abrasive paper was visually observed and evaluated. The evaluation was made using the three levels: ◯ (no sticking), Δ (slight sticking) and X (severe sticking).

(7) Travelling property

The contact between coating film and rotating drum was made in the same manner as in the durability test, and a force generated between coating film and rotating drum (i.e. travelling resistance) was measured by a U gauge in an atmosphere of 65° C. (temperature) and 80% (relative humidity). The travelling evaluation: ◯ (low travelling resistance), Δ (medium travelling resistance) and X (severe travelling resistance).

TABLE 4

| | Example 1 | Comparative Example 1 |
|---|---|---|
| Proportion of resins (Parts) | | |
| Vinyl chloride copolymer | A 50 | F 50 |
| Polyurethane resin* | (e) 55 | (h) 40 |
| Coronate L | — | 15 |
| Properties of resin solution, magnetic coating and magnetic tape | | |
| Pot life (days) | 10 | 3 |
| Reactivity (%) | 95 | 94 |
| Gloss (%) | 100 | 90 |
| Dispersibility (%) | 75 | <10 |
| Viscosity of coating (cp) | 2,500 | 4,000 |
| Squareness ratio | 0.83 | 0.78 |
| Durability | ◯ | Δ |
| Travelling property | ◯ | X |

*The amount of polyurethane resin added is expressed in solid content.

TABLE 5

| | Example | | | | | Comparative Example | | | |
|---|---|---|---|---|---|---|---|---|---|
| | 2 | 3 | 4 | 5 | 6 | 2 | 3 | 4 | 5 |
| Proportions of resins (Parts) | | | | | | | | | |
| Vinyl chloride copolymer | B 50 | C 50 | D 50 | B 50 | B 50 | F 50 | E 50 | C 50 | D 50 |
| Polyurethane resin* | (e) 55 | (f) 55 | (g) 55 | (c) 55 | (d) 55 | (d) 55 | (h) 40 | (a) 55 | (b) 55 |
| Coronate L | — | — | — | — | — | — | 15 | — | — |
| Properties of resin solution, magnetic coating and magnetic tape | | | | | | | | | |
| Pot life (days) | 10 | 8 | 7 | 10 | 10 | 3 | >20 | 8 | 7 |
| Reactivity (%) | 95 | 92 | 95 | 95 | 93 | 93 | 45 | 85 | 93 |
| Gloss (%) | 110 | 100 | 105 | 110 | 110 | 30 | 80 | 100 | 105 |
| Dispersibility (%) | 98 | 97 | 92 | 98 | 98 | 1> | 58 | 87 | 92 |
| Viscosity of coating (cp) | 1500 | 2300 | 2100 | 1500 | 1500 | 3500 | 3200 | 2300 | 2100 |
| Squareness ratio | 0.87 | 0.83 | 0.85 | 0.87 | 0.87 | 0.75 | 0.78 | 0.83 | 0.85 |
| Durability | ◯ | ◯ | ◯ | ◯ | ◯ | Δ | X | X | X |
| Travelling property | ◯ | ◯ | ◯ | ◯ | ◯ | X | X | Δ | Δ |

*The amount of polyurethane resin added is expressed in solid content.

I claim:

1. A magnetic recording medium comprising a nonmagnetic substrate and a magnetic powder containing magnetic layer formed thereon, said layer further containing a binder for the magnetic powder, said binder consisting essentially of a vinyl chloride polymer and a polyurethane polymer wherein the vinyl chloride polymer contains anionic hydrophilic group(s) in such a proportion that the molecular weight of the vinyl chloride polymer per one anionic hydrophilic group is 4,000–40,000 and wherein the vinyl chloride polymer contains an effective amount which is 2% by weight or less of hydroxyl group(s) not directly bonded to the main chain and wherein the polyurethane polymer contains 2.3 or more isocyanate groups per molecule and has a molecular weight of 2,000 to 40,000 and wherein the binder contains 20–80% by weight of the vinyl chloride polymer and 80–20% by weight of the polyurethane polymer, and the two polymers being crosslinked by each other.

2. A magnetic recording medium according to claim 1, wherein the vinyl chloride polymer contains, besides the hydroxyl group(s), at least one kind of hydrophilic group selected from the group consisting of (a) anionic hydrophilic groups derived from carboxylic acids, or sulfur- or phosphorus-containing acids or salts thereof and (b) cationic hydrophilic groups selected from the formula or $-N^{\oplus}R^1R^2R^3X^{\ominus}$ or $-NR_2 \cdot HX^1$ wherein $R^1$, $R^2$, $R^3$ and R each represent an alkyl group, an allyl group, an alkenyl group or an alkoxy group, and X and $X^1$ each represent a halogen atom, a residue of sulfuric acid, phosphoric acid or nitric acid, or a residue of an organic acid such as carboxylic acid, acidic sulfuric acid ester, acidic phosphoric acid ester or the like.

3. A magnetic recording medium according to claim 2, wherein the vinyl chloride polymer contains cationic hdyrophilic group(s) in an amount of 0.02–0.5% by weight in terms of nitrogen content.

* * * * *